Jan. 12, 1932.  A. G. RAYBURN  1,840,869
VARIABLE SPEED POWER TRANSMISSION
Filed Sept. 26, 1925  4 Sheets-Sheet 1

Fig. 1

Inventor
Alden G. Rayburn
William A. Strauch
Attorney

Jan. 12, 1932.    A. G. RAYBURN    1,840,869
VARIABLE SPEED POWER TRANSMISSION
Filed Sept. 26, 1925    4 Sheets-Sheet 2

Jan. 12, 1932.  A. G. RAYBURN  1,840,869
VARIABLE SPEED POWER TRANSMISSION
Filed Sept. 26, 1925   4 Sheets-Sheet 3

Inventor
Alden G. Rayburn
By William A. Strauch
Attorney

Patented Jan. 12, 1932

1,840,869

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

VARIABLE SPEED POWER TRANSMISSION

Application filed September 26, 1925. Serial No. 58,806.

The present invention relates to variable speed power transmissions.

More particularly the invention relates to variable speed power hydraulic transmissions of the character in which the maximum circulation of fluid occurs when the speed reduction and torque multiplication are maximum; and in which as the speed reduction and torque multiplication decrease, the circulation of fluid is decreased. Various transmissions of this type have been heretofore proposed, but none of these prior proposed arrangements have been sufficiently successful to meet the commercial demands for satisfactory transmission of power because of the cumbersome, complicated, costly, unreliable and inefficient arrangements and mechanisms utilized.

The primary difficulty in providing a commercially satisfactory hydraulic transmission which will transmit relatively large powers at high speeds lies in the provision of a satisfactory simplified pump and motor combination which will operate efficiently at high speeds and fluid pressures without excessive leakage of fluid from the system and in which the parts are of a size and weight which will compare favorably with the size and weight of the various mechanical and electrical variable speed power transmissions now in common use. While the reciprocating piston type of variable hydraulic motor heretofore used has been satisfactory for the motor unit, I have found it necessary to develop novel types of variable pumps especially adapted for utilization in hydraulic transmissions of the character mentioned; and to provide a novel combination of this specially adapted pump, with a reciprocating piston type of motor.

Accordingly objects of the present invention are to provide a novel simplified type of variable rotary fluid pumping arrangement in which the expansion of parts due to temperature rise is compensated and the side wall deflections under high pumping pressures are eliminated so that slippage is eliminated and high fluid pressures may be continuously maintained; to provide an efficient balanced rotary variable capacity pumping arrangement of simplified structure; and to provide an improved and simplified combination of rotary pump structures, improved fluid timing arrangements, and reciprocating piston fluid motors in a compact variable speed power transmission unit.

Other objects of the invention are to provide novel means for securing a direct mechanical transmission in high gear relation and a mechanically free neutral position in hydraulic transmissions; to provide novel reversing and control arrangements for hydraulic transmissions; and to provide novel manual and automatic controls for the ratio of transmission in variable hydraulic gears.

Still further objects of the invention are such as may be attained by a utilization of the various combinations, sub-combinations and principles hereinafter more fully set forth and as defined by the terms of the appended claims.

Figure 1:
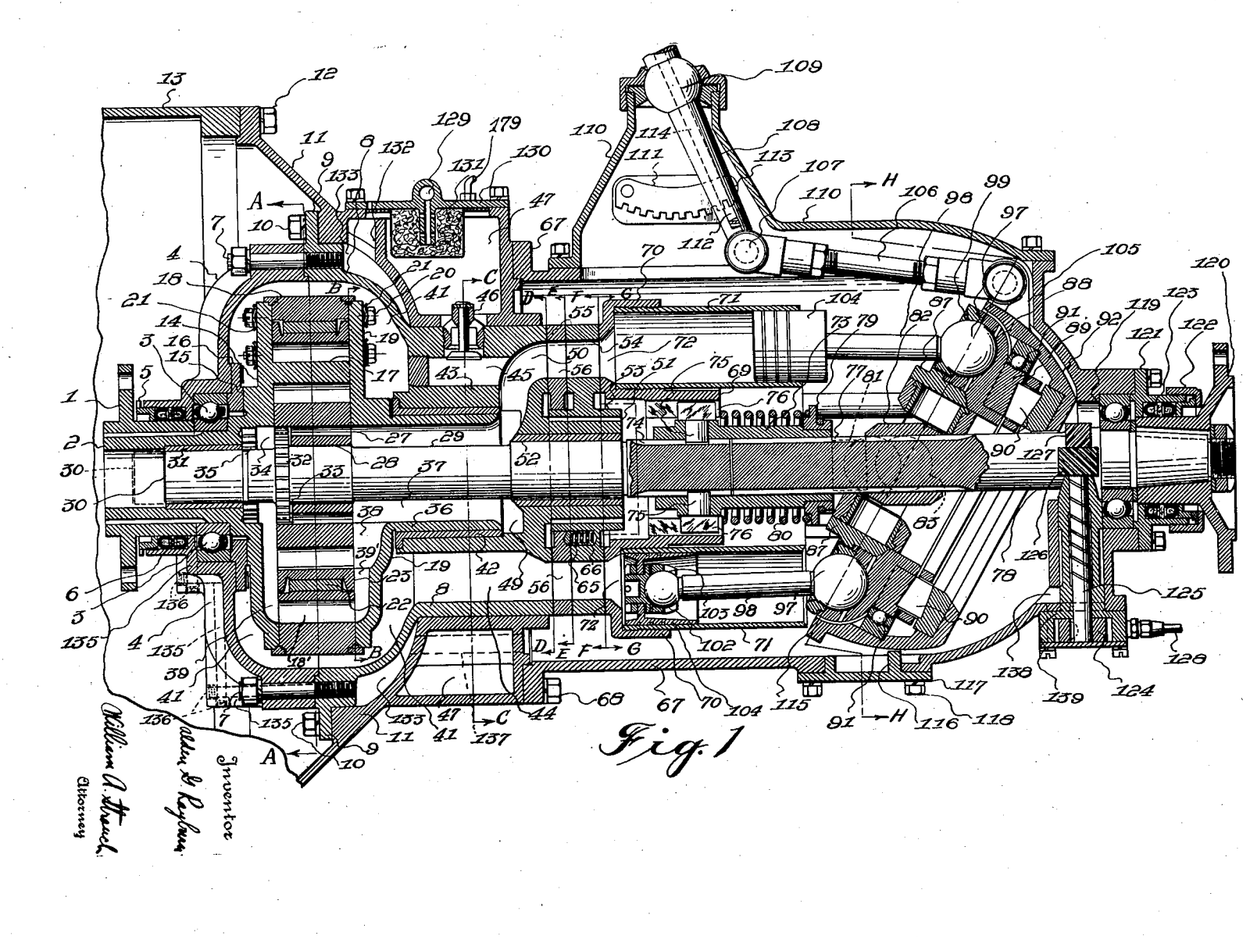
Figure 1 is a vertical sectional central view with parts distorted, of one form of the invention.
Figures 2, 3, 5, 6, 8:
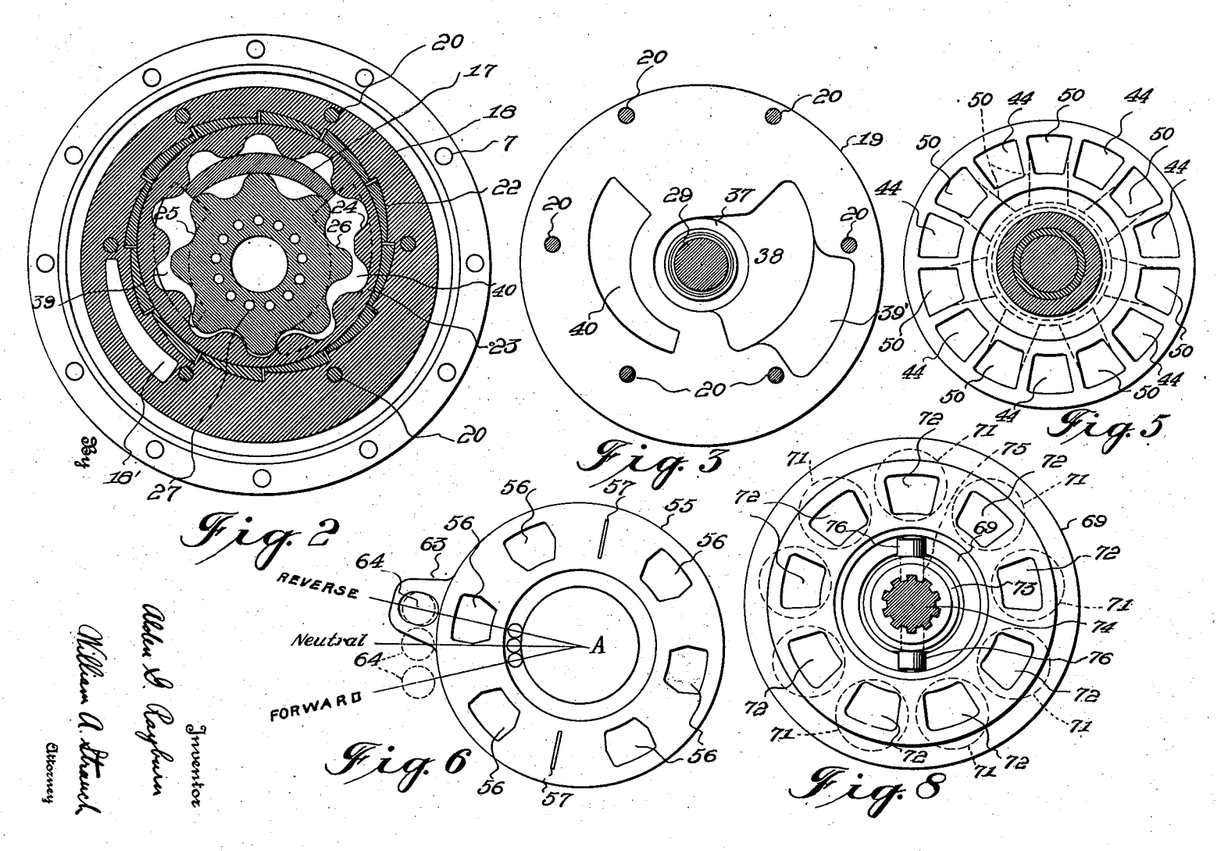
Figure 2 is a sectional view taken along line AA of Figure 1.
Figure 3 is a sectional view taken along line BB of Figure 1.
Figure 5 is a sectional view taken along line DD of Figure 1.
Figure 6 is a sectional view taken along line EE of Figure 1.
Figure 8 is a sectional view taken along line GG of Figure 1.

Referring to Figure 1, a coupling member 1 adapted to be coupled to a driving motor or other suitable driving means is keyed or splined to a pump driving sleeve member 2 which is mounted for rotation in suitable antifriction or ball bearings 3. The bearings 3 are supported in pump housing section 4 which is provided with a packing gland 5 adapted to compress the packing member 6 to prevent leakage of oil from the bearings 3 outward. The housing 4 is secured by means of studs 7 to a housing section 8 which in turn is provided with securing flanges or extensions 9. The flanges 9 are secured by means of the studs 10 to a casing section 11 which in turn is secured by means of the cap screws or studs 12 to a suitable housing or casing section 13. Formed integrally with sleeve 2 is a pump side wall 14 provided with shoulder 15 which is adapted to seat against bearing member 16 in turn secured to the pump housing section 4 and retaining the bearing 3 in position. The side wall 14 of the pump has secured thereto or formed integrally therewith sealing segment 17 (Figs. 1 and 2). A pump rotor bearing or supporting ring 18 through which an oil passage 18' is formed so that fluid may be fed freely to both sides of the pump gears in operation, is secured between the pump side wall 14 and a pump side wall 19 by means of bolts 20. Bolts 20 are provided with the spring washers 21 which yieldingly hold the side walls 14 and 19 against the rotary supporting member 18. Dowel pins 20' (Fig. 3) between segment 17 and side wall 19 aid bolts 20 in maintaining a proper relation of the pump side walls. Formed in the supporting member 18 are suitable Babbitt bearing sections 22 in which a rotor or ring gear is rotatable supported. Ring gear 23 is provided with the generated gear teeth 24, the tops or inner surfaces of which are adapted to engage the suitably curved outer surface of the sealing segments 17 as the ring gear rotates in supporting member 18. To maintain a sealing engagement between the teeth 24 and segment 17, the center of curvature of the outer surface of 17 is on the axis of rotation of ring gear 23. Meshing with the ring gear 23 and with its center of rotation eccentrically disposed with relation to the ring rotor is a central pinion or rotor 25 provided with the generated teeth 26. The shapes of the teeth 24 and 26 are of any well known gear tooth form so that they will mesh and a continuous contact between one or more of the ring gear and pinion teeth will be maintained in operation. The tops of teeth 26 are shaped to engage the inner surface of the sealing segment 17 during rotation of the pinion, the inner surface of segment 17 being curved about the axis of rotation of pinion 25 to maintain sealing engagement of teeth 26. Formed in the center part of pinion 25 are oil passages 27. Pinion 25 is rotatably mounted or journaled on a section 28 (Fig. 1) of a driven shaft 29. The axes of the pinion 25 and of a driven shaft 29 coincide and are in alignment with the axes of sleeve 2 and of the driving shaft or the driving means for the coupling member 1. Shaft 29 is provided at its left end with an end bearing section 30 which is slidably and rotatably supported and guided in the bushing 31 in turn mounted in the sleeve 2. A toothed dogging or clutch member 32 is formed integrally with or secured to the shaft 29 and meshes with clutch teeth 33 formed integrally with the pinion 25. Formed in the side wall 14 of the pump is a recessed section 34 in which the toothed dogging member 32 is adapted to be positioned in order to free the rotor from mechanical connection with the shaft 29, and formed in the side wall 14 of the pump are the internal clutching teeth 35 adapted to mesh with the toothed member 32.

Figure 4:
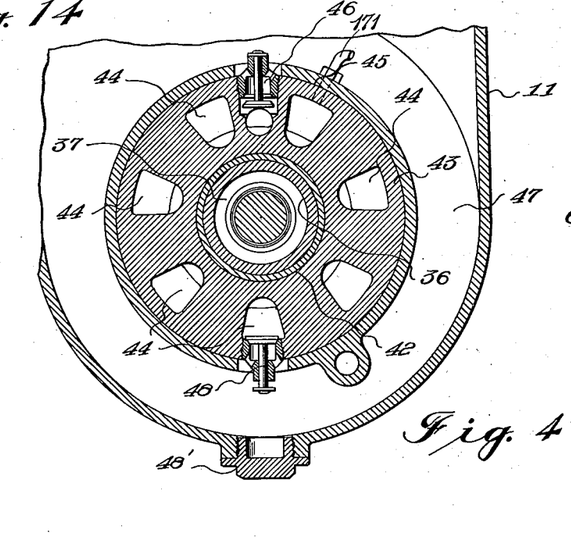
Figure 4 is a sectional view taken along line CC of Figure 1.
Figure 7:
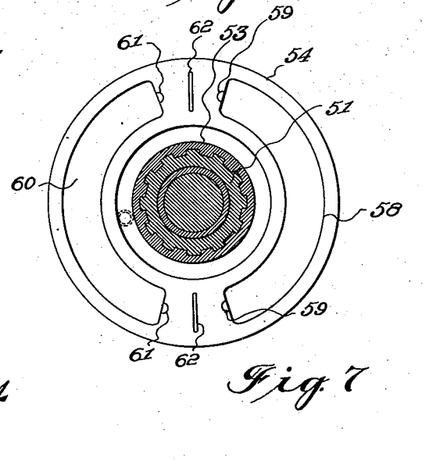
Figure 7 is a sectional view taken along line FF of Figure 1.

Pump side wall 19 has formed integrally therewith a central sleeve section 36 (Fig. 1) which surrounds the shaft 29 and forms an annular circular fluid intake passage 37 which communicates through the passage 38 (Figs. 1 and 3) with the low pressure or intake chamber 39' formed by the pump side wall 19. A somewhat similar chamber or recess 39 is formed in the opposite side wall 14, and the chambers 39 and 39' are interconnected by the passage 18' formed in the supporting ring 18. Formed in the side walls 14 and 19 on the high pressure side of the pump are the outlet ports 40 (Figures 2 and 3) which connect the high pressure side of the pump with the chamber 41 surrounding the outer surface of the pump side walls 14 and 19 and the supporting ring 18 as shown in Figure 1. Sleeve 36 is supported and rotatably journaled in a bushing 42 which is supported in an extension 43 of the stationary pump housing section 8. Formed in extension 43 of the housing are the high pressure fluid outlet ports or passages 44 (Figs. 1, 4 and 5) which extends straight through the member 43 to the outer end valve face thereof. An oil intake passage 45 for the system is formed in member 43 preferably by drilling a hole the end of which is stopped from connection with high pressure chamber 41 by means of a suitable screw plug. A check valve 46 connects passage 45 and an oil storage reservoir 47 (Figs. 1 and 4) suitably formed in the casing section 11. A check valve 48 connects the storage reservoir 47 with the lower passage 44 to permit fluid to pass into the normal high pressure side of the circulating system when the fluid pressures are reversed in operation, and a suitable drain plug 48' (Figure 4) is provided for the storage reservoir.

Formed in the member 43 is an annular fluid passage or conduit 49 (Fig. 1) which communicates with the outer end of the inlet or pump feed passage 37 and with the inner ends of low pressure ports 50. Ports 50 are formed in the member 43 and connect the annular conduit 49 with the valve seat or face of the member 43 between the high pressure ports or passages 44.

An extension 51 (Fig. 1) of member 43 is provided with a bushing 52 in which an enlarged bearing section of the shaft 29 is rotatably and slidably supported. Slidably splined to the outer surface of the extension 51 is a sleeve 53 with which a valve timing plate 54 is integrally formed. Journaled on the sleeve 53 between the end face of the plate 54 and the end or valve face of member 43 is a control valve plate 55. Control valve plate 55 is provided with the ports 56 (Fig. 6) with dead center relief ports or slots 57. Formed in the timing plate 54 is a motor timing port 58 provided with the relief tailings 59, and a motor timing port 60 provided with relief tailings 61. Dead center relief ports or slots 62 are provided in the timing plate 54 and are adapted to register with the ports 57 in the valve plate 55, when the valve plate is in neutral position. The valve plate 55 is provided with an actuating ear or extension 63 which is shifted as indicated in Figure 6 by means of a shifting member 64 (Figure 6) to control the flow of fluid from the pump. The relative proportions and positions of ports 56 with respect to the ports 44 and 50 in the face of member 43, and with relation to the ports 58 and 60 is such, that with the member 64 in the central dotted position shown in Figure 6 adjacent ones of the ports 44 and 50 will be interconnected and with the member 64 in the upper or full line position the high pressure ports 44 in the face of 43 opposite port 58 of the timing plate 54 will be covered and only low pressure ports 50 will be connected with the motor timing port 58 while the low pressure ports 50 opposite port 60 of the timing plate will be covered and only high pressure ports 44 will be connected with the motor timing port 60. With the member 64 in the lower position indicated by the dotted circle in Figure 6 ports 50 only will be in communication with the motor timing port 60 and ports 44 will be in communication with the motor timing ports 58. In this way with the valve 55 in its central position the high pressure and low pressure ports 44 and 50 are interconnected and the transmission is in neutral, with the member 64 in lower position the transmission is in forward running position, and with the member 64 in upper position the transmission is in reverse running position.

Valve plate 55 is preferably limited in its rotary motion by means of a pin 65 (Figure 1) which seats in a drilled hole in the valve timing plate 54 and is pressed into a suitable limiting slot in the valve plate 55 by means of a spring 66. The actuating member 64 for the valve plate 55 is preferably operated by a suitable control mechanism (not shown) supported in a casing 67 which may be operated by a foot pedal or other suitable means from the outside of the case as for example by a pedal similar to a clutch pedal of an automobile. Casing 67 is secured to the casing 11 by means of suitable securing studs or bolts 68 (Fig. 1).

A motor cylinder supporting base 69 is provided with suitable means such as the threaded sockets 70 for receiving motor cylinders 71. The base 69 is provided with a valve face (Fig. 8) adapted to seat against the side face of the valve timing plate 54 and in which the fluid ports 72 for the cylinders 71 are formed. The ports 72 (Figure 8) provide means for admission of the operating fluid to the motor cylinders, and alternately communicate with the ports 58 and 60 in the valve timing plate 54, as will more fully hereinafter appear. The motor base or cylinder supporting member 69 is slidably supported on a coupling member 73 (Figures 1 and 8). Formed on the inside of member 73 are driving splines into which the splined end of an extension 74 of shaft 29 slidably fits. Connecting pins 75 extend through member 73 into recesses formed in the end of extension 74 and pins 75 are provided with enlarged sections or heads 76 adapted to slidably fit in keyways formed in the motor base 69. A splined section 77 of the driven or tail shaft 78 slidably fits into coupling member 73. Secured to the end of coupling member 73 is a removable collar 79 and interposed between collar 79 and the motor base 69 is a helical spring 80 which functions to hold the motor base with its end face against the face of the valve plate 54 when there is no pressure reactance tending to hold the motor in position, and also urges the coupling member 73 together with the shaft 29 and the parts connected thereto to the right in Figure 1.

Figure 9:
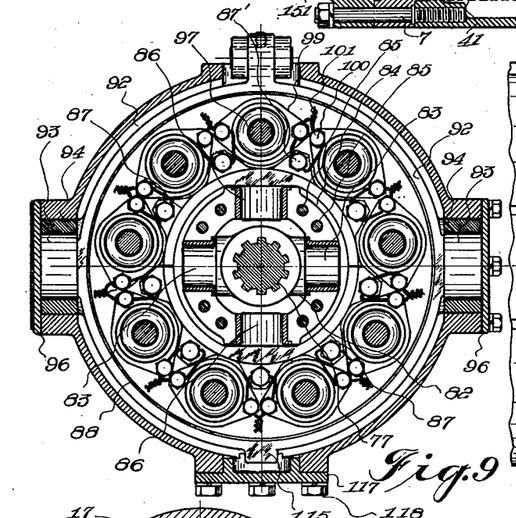
Figure 9 is a sectional view taken along line GG of Figure 1.
Figure 10:
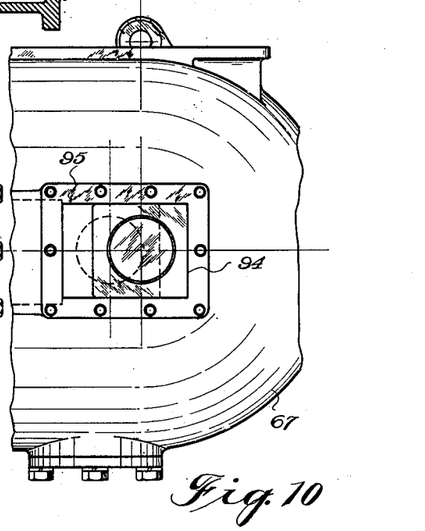
Figure 10 is a fragmental side elevation of the parts of the mechanism illustrated in Figure 9.

Connected integrally with the coupling member 73 by means of connecting sections 81 is the universal driving member 82. Universal driving member 82 is provided with trunnions 83 (Figures 1 and 9) which in turn are connected by means of the split rings or collars 84 suitably bolted together by the bolts 85 to the trunnions 86 formed integrally with the split universal connecting ring 87 at the mid portions of the half sections. The universal connecting ring 87 is secured by means of suitable studs or cap screws 87' (Fig. 9) to a rotatable driving plate 88 (Fig. 1) which in turn has secured thereto a suitable bearing plate 89. The bearing plate 89 is supported by means of the roller bearings 90 and the ball bearings 91 from a variable angle plate 92 which in turn is provided with trunnions 93 (Fig. 9). The trunnions 93 are mounted in bearing blocks 94 which in turn are mounted for a sliding movement in the slots 95 (Fig. 10) of the casing 67. Suitable cover plates 96 are provided over the slots 95 to completely enclose the operating mechanism. In order to permit free rotation of the plates 88 and 89 together with the connected parts at various angular positions, it is essential that sufficient clearance be provided trunnions 83 and 86 and the connecting collar members or rings 84 to permit a sliding motion of the collar members on the trunnions of a sufficient amount to compensate for the irregularities of motion of the collar members on the trunnions 83 and 86 due to the center of universal motion being at the intersection of the trunnion axes while the angular relation of parts to the drive shaft 78 is varied.

Seated in suitable recesses formed in driving plate 88 (Figures 1 and 9) are the ball ends 97 of piston rods 98 which are held in position by means of securing caps 99, in turn secured to plate 88 by suitable cap screws 100. Cap screws 100 are locked against turning by wires 101 which pass through drilled holes in adjacent cap screws 100 and 87' (Figure 9). Formed on the inner ends of the piston rods 98 are the ball members 102 which are secured by means of socket members 103 to motor pistons 104. Pistons 104 are provided with suitable sealing rings and are adapted to reciprocate in the motor cylinders 71. Formed at the upper part of the variable angle plate 92 are the extensions 105 to which one end of the actuating link 106 (Figure 1) is pivotally connected, the other end being connected at 107 to control lever 108. Lever 108 is supported by a suitable ball and socket connection 109 from a housing 110 secured to the top of the casing 67 by suitable bolts. Supported from the cap 110 is a notched rack segment 111. A locking member 112 suitably supported in a slot formed in the lever 108 and pressed upward by means of a spring 113 is adapted to seat in the notches in segment 111. The locking member 112 is actuated by a suitable rod 114 extending downward through the lever 108 which controls the engagement of the locking member 112 with the rack 111.

Formed at the bottom of the member 92 is a projection 115 (Figures 1 and 9) which is adapted to engage a projection 116 of a cap 117 secured to the casing 67 by means of cap screws 118. The relation of the projections 115 and 116 is such that as the disc 92 is brought into vertical position by means of the lever 108 and link 106, projection 115 will engage projection 116 and disc 92 will then be forced to the left in Fig. 1, as will more fully hereinafter appear.

Shaft 78 is supported in a suitable antifriction bearing 119 seated in the end of casing 67, and secured to the outer end thereof is a coupling member 120. A cap 121 holds the bearing 119 in position in the casing 67 and a suitable packing gland 122 adapted to compress the packing 123 around the coupling 120 is provided to prevent oil leakage out of the case 67 past the bearing 119. A gear pump 124 suitably mounted in the casing 67 is driven by a spindle 125 which in turn has secured thereto and is driven by spiral pinion 126 meshing with a spiral gear 127 formed integrally on or secured to the shaft 78 in any suitable manner. Oil from the pump 124 is delivered through a conduit 128 which is connected to the oil inlet 129 mounted on the cover 130 of the storage reservoir 47. From the inlet 129 the oil passes into an oil filter 131 and from the filter the cleaned oil passes into the storage space or reservoir 47. When the reservoir 47 is filled to the top of the dividing partition 132 the oil overflows into the space 133 formed between the casing 11 and the pump housing section 8. Oil leakage from the bearing 3 passes through the conduits 135 which preferably are formed of drilled holes the ends of which are sealed with the screw plugs 136, into the space 133. When the space 133 is filled to the level of the conduit 137 formed in casing section 11 the oil passes into the lower part of casing 67 and when the level of the oil rises in the casing 67 to the level of the conduit 138, the oil overflows from the casing 67 into the suction or feed conduit 139 of the gear pump 124. In this way it will be seen that the leakage from the circulating system is returned to the storage reservoir after passing through a filter.

In operation of the form so far described the coupling member 1 is driven by the driving motor or driving means and rotates the pump driving sleeve 2. The driving sleeve 2 drives the pump side wall 14 which in turn, through the connecting bolts 20 drives the bearing member 18, pump side wall 19 and sleeve 36. The pump side walls together with the bearing member 18 rotate as a unit, and due to the eccentricity of the mounting for the ring gear 23, if the pinion 25 is held stationary, the ring gear will slip in its bearing a distance of two teeth for each revolution of the pump side walls, and the teeth will have gone into and out of mesh all around the rotor 25, with the result that a pumping action equal to one complete revolution of the rotor 25 with the side walls stationary will occur. As the high pressure chamber 41 entirely surrounds the pump side walls, and the low pressure or intake chamber 39 and high pressure outlet ports are fixed with relation to the pump side walls fluid will be delivered continuously under high pressure into chamber 41. The area of the outer surface of the pump side walls exposed to high pressure fluid in the chamber 41, is made slightly greater than the inner surface of pump side walls so that the total external pressures forcing the pump parts together is more than the total internal pressures tending to separate the parts in operation. The spring washers 21 hold the parts in assembled relation together with sufficient pressure to permit the generation of initial fluid pressures which then operate to hold the side walls in close contact with the pump gears regardless of the amount of pressure developed in the pump. The pump side walls are free to separate as the rotors expand due to increase in temperature of the parts, but deflections of the side walls due to the high pressures and the consequent leakages developed by this action are substantially avoided. At the same time, due to the surrounding of the pump parts with high pressure fluid, any pump leakage which occurs is inward to the central low pressure chamber of the pump and not lost from the circulating system of the transmission and such leakage lubricates the bearing surface of the pump side walls. In addition it will be seen that the disposal of the intake in the center of the pump utilizes the centrifugal energy of the fluid due to rotation, to aid the pumping action. In this way it will be seen that an improved rotary pump is provided especially adapted for hydraulic transmissions but the principles of which are useful in other relations, in which high pressures may be developed without causing side wall deflections and leakage caused thereby, and in which the parts are permitted to expand due to temperature rise without causing leakage, or binding of parts.

From chamber 41 the fluid will pass through ports 44, and with valve 55 set in the forward position shown in Fig. 6, fluid from ports 44 will pass through port 58 of the timing plate 54 into the motor cylinder 71 adjacent the port 58 through the ports 72. It will be noted that the port 58 is slightly less than 180 degrees in angular length, and just as each cylinder 71 comes into communication with the end of port 58 the corresponding piston 104 will be starting from its extreme left position in Fig. 1 to the right. The fluid forced into cylinders 71 in this way tends to drive pistons 104 to the right in Fig. 1. With the angle plate 92 positioned at an angle as shown in Fig. 1, the force against pistons 104 reacts through the member 88 to cause rotation of member 88 which through trunnions 83 and member 82 drives tail shaft 78, coupling member 73, motor base 69, cylinder 71, shaft 29, and the rotor 25 in a forward direction. At the end of the stroke of each piston 104 to the right in Fig. 1, the corresponding cylinder 71 will pass over the land between ports 58 and 60, and as the piston starts to move to the left in Fig. 1, the fluid contained therein will be discharged through the cylinder port 60 and will pass through ports 50, chamber 49, inlet passages 36 and 38 to the low pressure chamber 39. In this way it will be seen that a continuous circulation of fluid through the system is maintained so long as the pistons 104 are permitted to reciprocate by the inclination of wobble disc 92.

The driving torque delivered by the tail shaft 78 and the speed of rotation will depend upon the relative volumetric fluid capacities of the pump and motor. The ratio of input torque to output torque at the tail shaft will be the ratio of the volumetric capacity of the pump to the volumetric capacity of the motor less losses due to the friction, slipping or leakage and the like in the system while the relative speeds will vary inversely with the torque ratio. It will accordingly be seen that any desirable maximum ratio of output to input torque may be provided by suitably proportioning the pump and motor capacities. In addition to the driving effect of the fluid motor, the reactance of the rotor 25 due to the pumping action together with the frictional resistance of the pump side walls and parts against the sides of the rotor 25 will be transmitted through shaft 29 to the tail shaft 78. Under ordinary conditions, as for example, when driving a locomotive or a motor vehicle the maximum torque must be exerted to start tail shaft 78 into rotation under load. As the load is accelerated, less torque will be required to maintain the rotation of shaft 78, and the control lever 108 may be shifted to swing angle plate 92 into vertical position about trunnions 93. This will decrease the length of stroke of the motor pistons causing a corresponding decrease in the volumetric capacity of the motor, and the rotation of shaft 78 will speed up accordingly. As shaft 78 speeds up the speed of rotation of shaft 29 and rotor 25 will be increased and the number of revolutions of the driving member 1 necessary to effect a relative displacement of two teeth between ring gear 23 and rotor 25 will be increased producing a corresponding decrease in the volumetric fluid displacement of the pump per revolution of the driving member 1. When the driving member 1 and the tail shaft 78 are rotating at the same speed no pumping of fluid will occur. If the angle plate or wobble plate 92 is not shifted to decrease the torque ratio and increase the speed ratio of the tail shaft to the input torque and speed, the motor tends to act as a pump decreasing the pressure in chamber 41 and increasing the pressure in chamber 39. This action opposes the rotation of tail shaft 78 and a definite relation of input torque and speed, to output torque and speed is established for each position of the wobble plate 92 between its maximum angle and vertical position. The angle plate 92 may accordingly be positioned at the proper angle to give the desired tail shaft torque or speed between the minimum and maximum values. As the load on the tail shaft approaches a value which may be handled directly by the driving means without the necessity for multiplying the driving torque the angle plate 92 may be brought into vertical position. In this position no reciprocation of the motor pistons is possible, and the motor has no volumetric displacement. As a result the fluid will come to rest in the system and the pump ring gear 23 can no longer move with relation to the rotor 25. The pump parts will then be locked together and will rotate as a unit transmitting all of the driving torque without multiplication from the member 1 through the locked fluid to the rotor 25, shaft 29 and coupling member 73 to tail shaft.

When the transmission is utilized for a motor vehicle under certain conditions, as for example when the vehicle is traveling down hill the tail shaft 78 will become the driving member. Under these conditions the motor will become a pump forcing fluid under pressure from chamber 41 into chamber 39 and the pump will become a motor tending to rotate the driving member 1 until the internal pressure becomes sufficient to force the side wall 19 to the right in Fig. 1 against the action of washers 21. The seal between the chambers 39 and 41 will be broken and the motor will circulate fluid through the system against resistance to flow of the fluid. As soon as the tail shaft ceases to be driven pressures will build up in the chamber 41 and the pump parts will again be pressed together by the action of spring washers 21 and the fluid pressures developed. The parts will then be in driving relation.

As shown in Figure 1 provision is made for disengaging the rotor 25 from its driving relation with the shaft 29 to eliminate any drag which might occur due to resistance of the fluid when valve 55 is in neutral position. With the angle plate 92 in vertical position and the valve plate 55 placed in neutral position as indicated in Fig. 6 connecting the high and low pressure ports 44 and 50, the fluid is short circuited and causes the fluid pressure to drop, relieving the pressure on rotor 25. Now by actuating lever 108 to cause further movement of wobble disc 92 in a counter-clockwise direction in Fig. 1, projection 115 of the angle plate will engage projection 116 of the casing 67 and the angle plate 92 together with the trunnions 93 and the blocks 94 will be moved to the left in Figures 1 and 10. This movement of the angle plate causes a movement of the motor pistons to the left in Figure 1 and forces the fluid from the pump and motor system into the storage reservoir 47 through the check valve 46 which will open, due to its weight when the fluid pressure is relieved by shifting valve 55 to neutral position. The weight of the check valve 46 is sufficient to prevent closing of this valve due to the relatively small back pressure generated by this movement of the motor pistons. As the angle plate moves to the left coupling member 73 is shifted compressing spring 80 and shifting shaft 29 through the action of the connecting pins 75. Movement of the shaft 29 to the left in Figure 1 causes disengagement of the clutch member 32 from the rotor clutch teeth 33 and moving it into the space 34. In this position of parts, driving of the pump side walls will simply cause rotation of the rotor 25 on section 28 of shaft 29 and no pumping effect will result.

In order to prevent losses due to slippage or leakage of fluid when the transmission is not multiplying the torque, the clutch member 32 is shifted into space 34 as above set forth. Shaft 29 will be rotating substantially at the same speed as the pump side walls and the driving member in this case when disc 92 is in vertical position. The counter-clockwise movement of disc 92 is then continued until teeth 32 engage teeth 35 formed in pump side wall 14. The driving member is then connected by direct mechanical connections to tail shaft 78. To maintain the clutch member 32 out of engagement with teeth 33 against the compression of spring 80, it is necessary to lock the arm 108 in the proper position by means of locking rack 111 and locking member 112. When the clutch member 32 is to be thrown into engagement with the rotor clutch teeth 33, locking member 112 is disengaged from rack 111 and spring 80 then forces coupling member 73 together with the connected parts to the right in Fig. 1 until trunnion block 94 engages the end of slot 95, when the rotor 25 will again be clutched to shaft 29.

When the tail shaft 78 is to be driven in the reverse direction or opposite to the rotation of member 1, valve 55 is shifted to the reverse position shown in Fig. 6, and the fluid under high pressure will enter the motor cylinders through the port 60 of timing plate 55 and will be discharged from the port 58. This reverses the direction of rotation of the plate 88 and parts driven thereby, causing a reversal of rotation of the shafts 78 and 29. The reversal of rotation of the shaft 29 drives tht rotor 25 in a direction opposite to the rotation of the pump side walls increasing the speed of relative rotation of the rotor 25 and the ring gear 23. The result is that the volumetric capacity of the pump or the pumping speed is relatively increased while the rotor reaction due to pumping opposes rotation of the tail shaft. The maximum torque on the tail shaft in reverse is accordingly substantially less than that attained in the forward driving direction. To utilize the fluid reverse driving effect, the relative volumetric pump and motor capacities must be proportioned to give the desired reverse tail shaft torque, and ample forward driving tail shaft torque will then be available.

While means for disengaging the pump rotor from the driven shaft and providing a direct mechanical connection between the driving and driven shafts have been shown and described in the form illustrated in Figs. 1 to 10, it will be understood that these connections may be eliminated and in this case trunnions 93 and the block 94 will be fixed and projections 115 and 116 eliminated.

Leakage of fluid from the system is drained from the various bearings through the conduits 135 into the space 133 from which it passes into the casing 67. The leakage overflows into the gear pump 124 and is returned through the conduit 128 to the filter 131 and then passes into the storage tank. In this way a fixed level of fluid is maintained in the case while the excess leakage is filtered and returned to the storage tank to be again used. The system is preferably filled with enough fluid and the parts are proportioned to maintain a continuous overflow from the tank 47 over wall 132 in the casing so that in addition to the constant level of fluid in the casing a constant level of fluid in the storage tank is maintained independently of the leakage. In this way a constant pressure or head due to gravity is maintained for feeding fluid to the circulating system and air entrained in the fluid escapes from the top of the tank by means of a vent or hole in the tank cover without causing emulsification.

Figure 11:
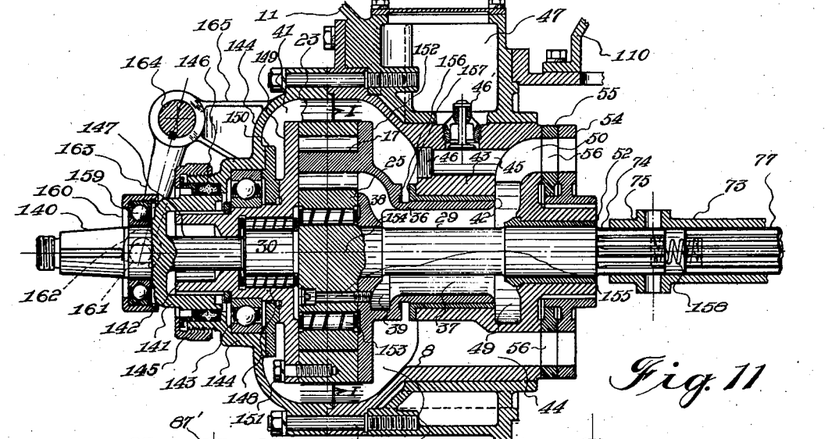
Figure 11 is a sectional side elevation showing a modified form of pump adapted for use in place of the pump shown in Figure 1.
Figure 12:
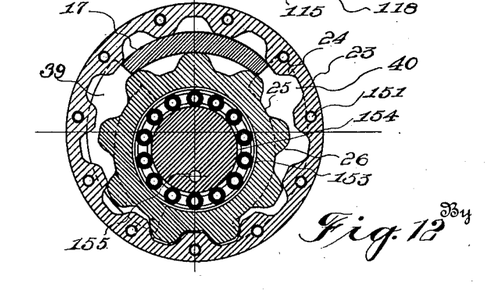
Figure 12 is a sectional view taken along line I—I of Figure 11.

In Figures 11 and 12 a modification of the form of pump and valve so far described is set forth, in which the friction of the pump rotor parts is substantially reduced. In this form of the invention a driving shaft section 140 is adapted to be driven by a suitable telescopic coupling member (not shown). Formed integrally with the shaft section 140 is a pump driving member 141 which is slidably splined to and drives the pump driving sleeve 142. Sleeve 142 is supported on a suitable roller or antifriction bearing 143 which in turn is supported in the pump housing section 144 secured by studs 7 to the housing section 8. A packing gland 145 is provided in the end of section 144 and is adapted to compress packing members 146 to prevent oil leakage past the outer surface of the driving member 141 and at the same time permit a rotary and sliding motion of the member 141 in the packing gland. Formed integrally with the member 141 and slidably journaled in sleeve 142 is pump releasing extension 147, the end of which is adapted to engage the bearing section 30 of driven shaft 29. Bearing section 30 of shaft 29 is slidably and rotatably journaled on antifriction rollers 148 mounted in the sleeve 142. Formed integrally with the sleeve 142 is the pump side wall member 149 which is adapted to seat against the bearing plate 150 in turn secured to housing section 144. The ring gear or rotor 23 in this form of pump is rigidly secured to the pump side wall 149 by means of suitable securing cap screws 151 and the inner surface or tops of the teeth 24 of the ring rotor are adapted to engage the outer surface of sealing segment 17 formed integrally with or secured to the pump side wall 152. The teeth 24 of the ring gear 23 mesh with the teeth 26 of the central pinion or rotor 25 and the tops of the teeth 26 are adapted to engage the inner surface of the sealing segment 17 in operation of the pump. The pinion 25 is slidably journaled on the antifriction rollers 153 which in turn are supported on the eccentric 154 integrally formed or rigidly secured to the drive shaft 29. A locking cap screw 155 is provided to insure maintenance of the relative position of the pump side wall 152 and the eccentric 154. The side wall 152 has formed integrally therewith the sleeve 36 which surrounds shaft 29 and forms the central pump inlet passage 37 which communicates with the fluid passage 38 and chamber 39 formed in pump side wall 152. Sleeve 36 is rotatably and slidably supported in bushing 42 and is provided with a surface 156 adapted to seat against the end face 157 of bushing 42 with the side walls of the pump separated as will more fully hereinafter appear. High pressure ports 40 of the pump are formed in the side walls 149 and 152 and connect the high pressure chamber 41 formed by housing sections 144 and 8, with the pressure side of the pump. The construction and arrangement of the motor parts, valve timing plate 54, the valve 55, and the coacting ports and of all parts designated by characters under 140 is the same as above set forth and described in connection with Figures 1 to 10. Like parts have been given like reference characters in both modifications and a full understanding will be had of these parts by reference to the description above given. The arrangement of the splined section 74 of shaft 29 and the splined section 77 of the shaft 78 shown in Figure 1 is modified by separating the ends of these sections and interposing a helical spring 158 between the ends thereof. The pins 75 in this form do not extend into the splined section 74 so that the shaft 29 together with the section 74 is movable endwise independently of the movement of coupling member 73. Instead of supporting the trunnion members 93 of the angle plate 92 in a slidable block as in the form above set forth, in the present form the trunnion blocks 94 are fixed. Accordingly no provision for an endwise movement of the blocks 94 together with the drive plate 88 and the coupling member 73 is made. To provide for shifting of the shaft 29, side wall 152 and eccentric 154 endwise as a unit, the shaft section 140 is rotatably supported in an anti-friction or roller bearing 159 in a shifting collar 160. Collar 160 is provided with trunnions 161 which are engaged and shifted by the jaw extensions 162 of the shifting arm 163. Shifting arm 163 is keyed to and rotatable with a spindle 164 which is supported in a suitable bracket 165 formed integrally with the pump housing section 144. A suitable control mechanism may be provided for spindle 164 to cause movement of the shaft 29 together with the pump side wall 152 and connected parts to the right in Figure 11 and away from the ring gear 23 and the pump side wall 149.

In the operation of this form of the invention, spring 158 holds shaft 29 together with the pump side 152 against rotor 23 and side wall 149. As shaft 140 is driven the sidewall 149 together with the ring gear 23 secured thereto will be rotated. Due to the eccentric relation of ring gear 23 and rotor 25 and the rotatable mounting of the rotor on eccentric 154, with shaft 29 held stationary, for each revolution of ring gear 23, all of the teeth of the ring gear will have gone into and out of mesh with the rotor teeth and the rotor will have advanced with relation to the ring gear equal to the difference in the number of teeth on the ring gear and rotor. Accordingly one full pumping revolution or cycle of the parts will have occurred and fluid under high pressure will be forced from chamber 39 through ports 40 in side walls 149 and 152 into chamber 41. The pressure developed in chamber 41 holds the parts in operative position in the manner above set forth in connection with the pump action disclosed in Figs. 1 to 10. As the speed of the tail shaft 78 approaches that of the driving shaft 140, the number of revolutions of the ring gear 23 necessary to complete a pumping revolution or cycle of the parts is equal to the relative displacement of the ring gear and pinion of the tooth difference between the ring gear and pinion will increase and when the tail shaft is traveling at the same speed as the driving shaft 140 the pumping action will cease. When it is desired to break the pumping action and to free the driving and driven shafts from driving relation, arm 163 may be actuated to shift shaft 29 together with side wall 152 to the right in Fig. 11. This will connect the chambers 39 and 41 directly and no pressure can be built up in the system. The remaining operation of the transmission will be understood from a reference to the description of operation of like parts above given. In this form of pump it will be noted that the bearing areas are substantially reduced so that large powers may be transmitted. It will be understood that the provision for shifting the shaft 29 endwise is not essential and may be eliminated with a corresponding simplification of structure of the pump. It will also be understood that with the trunnion blocks 94 fixed, the reversing of the rotation of shaft 78 may be effected by shifting the angle plate 92 to an angle with its vertical position opposite to that shown in Fig. 1, and the reversing position of valve plate 55 may then be eliminated.

Figure 13:
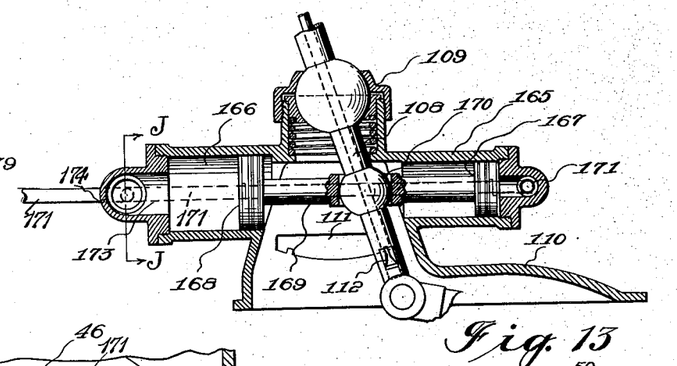
Figure 13 is a sectional fragmental view showing a form of automatic control adapted for use with the invention.
Figure 14:
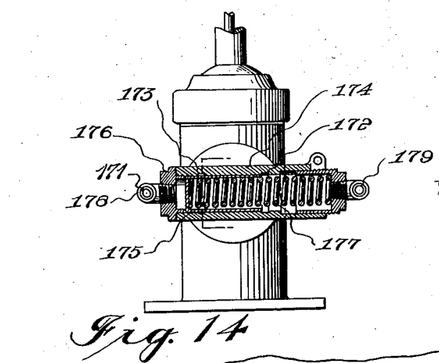
Figure 14 is a sectional view taken along line JJ of Figure 13.

In the form of invention so far described the shifting of angle plate or wobble disc 92 is controlled by a manually actuated control lever 108. In order to provide for an automatic control of the position of the angle plate 92 in accordance with variations in the torque required at the tail shaft the control device disclosed in Figures 13 and 14 is provided. Formed integrally with the casing 110 are the cylinders 165 and 166 of differing diameters and in which the differential pistons 167 and 168 are adapted to reciprocate. A common piston rod 169 has the pistons 167 and 168 secured to the ends thereof and is connected to the actuating lever 108 by means of ball connection 170 sliding in a central slot formed in rod 169. The cylinder 165 is permanently connected by means of conduit 171 to the high pressure side of a high pressure conduit 44, of the transmission. Cylinder 166 is provided with a fluid exhaust port 172 and a fluid inlet port 173 which connect the cylinder 166 with a cylindrical valve body 174. Seated in the valve cylinder 174 is a valve control or piston member 175 which is normally held against the inner end of head 176 by means of a coil or helical spring 177. Coupling 178 connects piston 175 to the high pressure pipe 171 from the transmission and delivers fluid under high pressure to the end of piston 175 through head 176. The opposite end of the cylinder 174 is permanently connected by a pipe or conduit 179 to the reservoir 47. The proportions and relative arrangement of ports 172 and 173, and of the controlling piston 175 are such that when the pressure admitted back of the piston 175 through the conduit 178 is sufficient to force the piston to the right in Figure 14 until port 173 is barely covered by the piston, the opposite end of the piston 175 will just cover the port 172. The strength of the spring 177 is such that when the pump pressure corresponding to the maximum torque of the driving means for the transmission is attained, the piston 175 will be forced to the right in Figure 14 until port 173 is sufficiently uncovered, and port 172 closed, to admit fluid pressure into the cylinder 166. As the piston 168 is greater in diameter than the piston 167, arm 108 will be actuated to shift the angle plate 92 clockwise about its trunnion pivots or members 93 in Figure 1, increasing the ratio of the tail shaft torque to the driving torque as above set forth. As a result the load on the driving means will decrease and the pressure generated by the pump will be correspondingly decreased. When the pressure has been reduced to the point where the piston 175 will cover both ports 172 and 173 the piston 168 will be locked against movement to the left in Figure 13 due to the trapping of fluid in cylinder 166 and the angle plate 92 will be held in a fixed position by the pressure on piston 167 until the load on the driven shaft 78 is changed and a corresponding reduction or increase in the driving torque and the pump pressure is affected. As the demands on the transmission to handle the load on the tail shaft drop the fluid pressure decreases and spring 177 will return the piston 175 to the position shown in Figure 14 and port 172 will be uncovered connecting piston 168 through the conduit 179 to the low pressure or supply reservoir of the pump. The pressure on the piston 167 will then become effective to force the angle plate towards its vertical position until the fluid pressure back of piston 175 becomes great enough to close ports 172 and 173. When the torque demand on the tail shaft is below the maximum torque of the driving means the angle plate 92 will automatically move to and be held in vertical position. In this way it will be seen that the ratio of transmission will be automatically regulated to meet the torque demands. When the form shown in Figure 1 is utilized, the movement of the angle plate will be continued until the shaft 29 is shifted to the left in Figure 1 and the teeth 32 engage the teeth 35 locking the parts mechanically.

It will be noted that the rack 111 in Figure 13 is provided only with notches at the ends of the travel of the member 108 so that the angle plate 92 may be locked on the quadrant only in high and low gear positions. In case the transmission is held by the automatic control in an intermediate position and it is desired to operate the lever 108 manually, the clutching member 55 is turned to the neutral position indicated in Figure 6. In this position the pressure back of the valve piston 175 is relieved, and spring 177 forces the piston 175 to the position shown in Figure 14. The cylinder 166 is then connected with the low pressure side of the pump while the pressure back of the piston 167 is also relieved and the lever 108 free to be shifted manually. By releasing lever 108 and shifting the clutch member 55 to forward position fluid pressures will build up in accordance with the torque reactions and the automatic control of the plate 92 will again become effective.

It will be apparent and understood by those skilled in the art that preferred embodiments only of the invention are disclosed and that wide variations therein may be made, and that the various sub-combinations described may be used independently and in various combinations without departing from the spirit of the invention as defined by the scope of the appended claims. Accordingly what is desired to be secured by the Letters Patent and claimed as new is:

1. In combination, a stationary chamber; a rotatable pump housing provided with movable side walls and journaled in said chamber; outlet ports in said side walls; a pump ring gear eccentrically journaled in said housing; a pinion centrally journaled in said housing and coacting with said ring gear to force fluid under high pressure through said outlet ports into said chamber substantially surrounding said housings; and a central fluid inlet to said gears.

2. A hydraulic transmission comprising a driving shaft; a fluid pump actuated by said driving shaft; a fluid motor mounted substantially in alignment with said pump along the axis of said driving shaft; connecting high and low pressure fluid conduits between said pump and motor; a shaft driven by said motor; a storage tank open to atmosphere and designed to feed fluid directly downward into said low pressure conduit by gravity; a casing surrounding said pump and motor adapted to retain the fluid leakage from said pump and motor; and a pump to return the excess leakage from said case to said storage tank substantially at atmospheric pressure.

3. The combination as set forth in claim 2 in which said storage tank is provided with an overflow into said casing.

4. A hydraulic transmission comprising a fluid circulating system embodying a pump, a fluid motor and interconnecting fluid passages between said pump and said motor; a casing surrounding said circulating system adapted to retain fluid leakage from said system; a gravity feed storage tank open to atmosphere for said circulating system, said storage tank being rigidly carried by said casing as a part thereof and having a restricted opening to atmosphere; and means for maintaining a constant fluid level in said storage tank by returning fluid thereto from said casing.

5. A hydraulic transmission comprising a fluid pump; a variable capacity fluid motor; low pressure fluid passages from the discharge side of said motor to the intake of said pump and high pressure fluid passages from the discharge side of said pump to the intake of said motor; said high pressure passages surrounding said low pressure passages in a manner to cause leakage of fluid inward to the intake pressure fluid side of said pump.

6. A hydraulic transmission comprising a fluid pump; a variable capacity fluid motor; high and low pressure fluid passages interconnecting said pump and said motor; and a control plate valve interposed in said passages maintained in sealing position by the fluid pressure reactance in said motor unit.

7. The combination as set forth in claim 6 in which said control valve is adapted in one position thereof to cause rotation of said motor in a forward direction; in another position thereof to directly interconnect said low and said high pressure passages; and in a third position thereof to cause rotation of said motor in a reverse direction.

8. A power transmission comprising a driving member; a fluid pump actuated by said driving member; a variable capacity fluid motor driven by fluid from said pump; a driven member actuated by said motor; and means for mechanically coupling said driven member to said driving member when said motor is at zero capacity.

9. In a power transmission, a shaft; a plurality of cylinders parallel to and rotatable with said shaft; fluid actuated reciprocating pistons in said cylinders; an angle plate driven by said pistons; and means embodying a universal connection between said plate and said shaft, said means further comprising a bearing member for said plate provided with a pair of axially aligned pivots, a member secured to said shaft provided with a pair of axially aligned trunnions, a second pair of aligned trunnions normal to said first pair and carried by said angle plate, and a collar member interconnecting said trunnions in a manner to cause the trunnion axes to intersect at the center of said shaft, said collar member being slidable on said trunnions a sufficient amount to compensate for variation in motion of the universal connection.

10. In a hydraulic transmission, driving means; driven means; a rotary pump comprising relatively rotatable complemental parts at least one of which is actuated by said driving means; and a fluid motor actuated by fluid delivered thereto by said pump, driving said driven means; said pump parts being separably related and there being means tending to urge them together during operation of the transmission.

11. In a hydraulic transmission; driving means; driven means; a rotary pump made up of complemental pumping portions actuated by the difference in rotation of said driving and said driven means, said pumping portions being relatively separably mounted and yieldingly held together by resilient means; and a fluid motor actuated by fluid delivered thereto by said pump, driving said driven means.

12. The combination as set forth in claim 11 in which said motor is a variable capacity motor to vary the relative speed and torque ratio between said driving and said driven means.

13. In a hydraulic transmission, driving means; driven means; a rotary pump actuated by said driving means, said pump comprising complemental portions mounted in a manner to permit relative separational movement; resilient and fluid pressure operated means for resisting the separating movement of said pump portions; in operation of the transmission; and a fluid motor actuated by fluid delivered thereto by said pump driving said driven means.

14. In a hydraulic transmission, the subcombination of a driving member; a driven member; a pump actuated by the difference in rotation of said driving and said driven members, comprising substantially parallel side wall members with co-acting pumping parts disposed between them mounted in manner permitting movement towards and away from each other; and means urging one of said wall members towards the other in operation of the transmission.

15. The subcombination as set forth in claim 14 in which said last mentioned means comprises means responsive to fluid pressures developed by said pump for urging said side wall members toward each other.

16. The sub-combination as set forth in claim 14 in which said last mentioned means comprises means responsive to spring pressures and fluid pressures to urge said side wall members towards each other.

17. A torque multiplying hydraulic transmission comprising driving means, driven means, a rotary gear pump comprising complemental parts rotated by said driving and said driven means respectively and having side wall members held in substantial fluid sealing relationship by fluid pressures developed by said pump; a fluid motor embodying a plurality of parts driving said driven member; fluid receiving and distributing means interposed between said pump and said motor; said motor parts being held in operative relationship with respect to each other and said receiving and distributing means by fluid pressures developed by said pump during power transmitting operations.

18. A torque multiplying hydraulic transmission comprising driving means; driven means; a gear pump embodying a plurality of parts rotated by the difference in rotation between said driving and said driven means; a stationary fluid receiving and distributing means comprising high and low pressure fluid chambers through which fluid is circulated by said pump; said pump parts being separable and held in substantial fluid sealing relationship by the fluid pressures developed by said pump in operation of the transmission; and a motor embodying a plurality of parts driving said driven member, actuated by fluid circulated therethrough from said stationary distributing member, said motor parts being held in substantial fluid sealing and assembled relation with respect to each other and said fluid receiving and distributing means by fluid pressures during power transmitting operations.

19. The combination as set forth in claim 18 together with resilient means to initially hold said motor parts together and in substantial fluid sealing relationship with respect to said stationary receiving and distributing means when no fluid pressures are developed.

20. The combination as set forth in claim 18 in which said pump parts are held in fluid sealing relationship by resilient means when no pressures are being developed by said pump.

21. The combination as set forth in claim 18 in which said motor comprises a plurality of rotatable reciprocating elements imparting rotation to said driven means.

22. A hydraulic transmission comprising driving means; driven means; a pump made up of parts actuated by the difference in rotation of said driving and said driven means; stationary fluid receiving and distributing means provided with low and high pressure chambers through which fluid is circulated by said pump; non-rotatable ported fluid motor timing means; a control valve interposed between said non-rotatable timing member and said stationary fluid distributing and receiving member; and a hydraulic motor made up of parts driving said driven means receiving operating fluid through the ports of said non-rotatable member.

23. The combination as set forth in claim 22 with fluid operated means for holding said motor and pump parts in operative relationship with each other and with relation to said fluid receiving and distributing means, said non-rotatable timing means and said valve.

24. The combination as set forth in claim 22 together with resilient means for holding said motor and pump parts in operative relationship with each other and with relation to said fluid receiving and distributing means, said timing means, and said valve.

25. The combination as set forth in claim 22 in which said motor and pump parts are held in fluid sealing relationship with each other and with relation to said fluid receiving and distributing means, said timing means and said valve by the action of fluid pressures and resilient means.

26. In combination a driving member; a driven member, a pair of pump side walls driven by said driving member; pump gears interposed between said side wall members; one of which is rotatable with said driving member and the other being rotatable with said driven member; a motor driving said driven member actuated by fluid delivered thereto by said pump; and means for driving said driven member through said pump independently of fluid pressures in said motor.

27. A hydraulic torque multiplying transmission comprising a driving member; a driven member; a pump actuated by the difference in rotation of said driving and driven members; a motor actuated by fluid pressures delivered thereto by said pump driving said driven member; and means for driving said pump and said driven member through said pump independently of fluid pressures in said motor.

28. A hydraulic transmission comprising a driving member; a driven member; a pump comprising a pair of side walls with meshing pump gears disposed between them, said pump being actuated by the difference in rotation of said driving and said driven members; a motor driven by fluid delivered thereto by said pump, actuating said driven member; and means for establishing a driving connection between said pump and said driven member independently of fluid pressures in said motor.

29. The combination as set forth in claim 28 in which said last mentioned means comprises a means for establishing a mechanical connection between one of said pump side wall members and said driven member.

30. A hydraulic transmission comprising driving and driven means; a fluid pump actuated by said driving means; a fluid motor driving said driven means; connecting high and low pressure fluid conduits between said pump and motor; a storage tank open to atmosphere and surrounding said conduits to feed fluid to said pump, motor, and conduits by gravity; a pair of check valves, one of which is normally open and the other normally closed, for controlling communication between said tank and said conduits; a casing adapted to receive fluid leakage from said pump and motor; and means to return the excess leakage from said casing to said storage tank.

31. A hydraulic transmission comprising a driving member; a driven member; a pump actuated by the difference in rotation of said driving and said driven members; stationary fluid receiving and distributing means provided with high and low pressure fluid chambers through which fluid is circulated by said pump, said chambers being relatively large and radially spaced from the axis of said driven member; a motor driving said driven member through which fluid is circulated from said chambers; a stationary casing section surrounding said motor adapted to retain leakage fluid; a stationary gravity feed tank open to atmosphere feeding fluid into said chambers by gravity; a pair of check valves, one of which is normally open and the other normally closed, for controlling communication between said tank and said conduits; and means for returning fluid from said casing section to said storage tank in operation of the transmission.

32. A hydraulic transmission comprising driving means; driven means; a pump actuated by the difference in rotation of said driving and said driven means; stationary fluid receiving and distributing means provided with low and high pressure fluid chambers through which fluid is circulated by said pump; a motor driving said driven member through which fluid is circulated, a normally open passage leading from a source of fluid supply to said low pressure chamber in said stationary fluid receiving and distributing means; and means for closing said passage when fluid pressures are developed in said low pressure chamber during operation of the transmission.

33. In a torque multiplying hydraulic transmission, a driving member; a driven member; a fluid pump actuated by the difference in rotation of said members; a fluid motor actuated by fluid delivered thereto by said pump driving said driven member; stationary fluid receiving and distributing means interposed between said pump and motor; and a stationary casing receiving said transmission, said casing including a separately formed supporting casing section in which said stationary receiving means is rigidly mounted.

34. The combination as set forth in claim 33 in which said casing section is provided with a fluid storage chamber.

35. In the combination as set forth in claim 33, said casing including a second casing section surrounding said motor and secured detachably to said first casing section.

36. The combination as set forth in claim 33 in which said casing section is supplied with an extension adapted to be secured to the bell housing of a prime mover, and in which said casing includes a casing section surrounding said motor and detachably secured to said first mentioned casing section.

37. In a hydraulic transmission, stationary fluid receiving and distributing means, said stationary means being provided with a central low pressure fluid chamber and high pressure chamber outside of said low pressure chamber; a driven member journaled in and extending through said stationary member; a motor through which fluid is circulated from said chambers driving said driven member; a driving member; and a pump driven by said driving member and said driven member circulating fluid through said chambers.

38. The combination as set forth in claim 37 in which said low pressure chambers are provided with annular and unobstructed spaces and said high pressure chamber surrounds said low pressure chamber.

39. The combination as set forth in claim 37 in which said pump is a rotary pump provided with inlet and outlet ports so arranged as to develop a centrifugal pumping action.

40. The combination as set forth in claim 37 in which said pump is a gear pump provided with inlet and outlet ports so arranged that the low pressure side thereof is fed by centrifugal action.

41. A torque multiplying hydraulic transmission comprising a fluid circulating system embodying a pump and motor; stationary fluid receiving and distributing means interposed between said pump and said motor embodying low and high pressure chambers; a fluid storage space; a normally open passage from said low pressure chamber to said space together with means adapted to close the same when internal pressures are developed in said low pressure chamber; a normally closed passage between said storage space and said high pressure chamber, said passages being substantially diametrically opposite each other; and means for opening said last mentioned passage when higher pressures are developed in said storage space than in said high pressure chamber during operation of the transmission.

42. A hydraulic transmission apparatus comprising a driven shaft; a fluid motor for driving said shaft; a driving member; a pump driven by said driving member, said pump being of the rotary type and comprising separable complemental elements; and means for distributing said fluid between said pump and said motor, said means including a device forming a chamber surrounding said pump and designed to receive fluid under pressure from the latter, whereby said separable pump elements are maintained in fluid sealing relationship during operation of the transmission.

43. A hydraulic transmission apparatus comprising a driving member; a driven shaft; a fluid pump having a portion thereof actuated by said driving member and another portion actuated by said driven shaft; a fluid motor designed to rotate said driven shaft, said motor including adjustable means for varying its capacity from zero to a maximum; means for distributing fluid between said pump and motor; and mechanism for directly interlocking said driving member and said driven shaft; said motor including a device for actuating said mechanism upon movement of said adjustable means to its position corresponding to zero motor capacity.

44. In the apparatus defined in claim 43, said driven shaft extending into proximity to said driving member and being longitudinally shiftable; said mechanism including complemental coupling members upon said driving member and said driven shaft; and said actuating device being designed to shift said shaft to cause engagement of said coupling members.

45. A fluid operated transmission comprising driving and driven members; a fluid pump actuated by the difference in rotation of said driving and driven members; a motor driving said driven member and actuated by fluid delivered thereto by said pump; a fluid supply storage space surrounding said driven member and normally connected to the suction side of said pump; and means, including a stationary device having a normally opened check valve, for establishing communication between said storage space and the atmosphere.

46. In combination a driving member, a driven member, a fluid transmission between said driving and driven members comprising a fluid pump operated by the driving member and a fluid motor receiving fluid from said pump and applying power to the driven member, means for automatically varying the relative volumetric displacement of said fluid transmission as a function of fluid pressure variations in said system, a direct mechanical connection between said driving and driven members, means for engaging said direct connection automatically responsive to a decrease in pressure in the fluid transmission below a certain value, and means for preventing operation of the fluid transmission with increased pressures at high speeds of the driving member.

47. In combination a driving member; a driven member; a variable speed fluid transmission connected between said driving and driven members comprising a fluid pump operated by the driving member and a fluid motor receiving fluid from said pump and applying power to the driven member; shiftable means for causing said driving and driven members to rotate together substantially as a unit; and means, automatically responsive to certain working resistances imposed by said driven member, for actuating said shiftable means.

48. In combination a driving member; a driven member; a variable speed hydraulic drive means connected between said members and including a tilting element; means for intercoupling said members for unitary rotation; and control means designed for actuation by said tilting element, interconnecting the said hydraulic drive means and said intercoupling means so that the intercoupling means is actuated upon a predetermined running relationship being reached between said members through the hydraulic drive means.

In witness whereof I affix my signature.

ALDEN G. RAYBURN.